US012543029B2

(12) United States Patent
Nishida et al.

(10) Patent No.: US 12,543,029 B2
(45) Date of Patent: Feb. 3, 2026

(54) INFORMATION PROCESSING DEVICE AND NON-TRANSITORY COMPUTER-READABLE STORAGE MEDIUM STORING PROGRAM

(71) Applicant: SEIKO EPSON CORPORATION, Tokyo (JP)

(72) Inventors: Kota Nishida, Shiojiri (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 429 days.

(21) Appl. No.: 18/159,314

(22) Filed: Jan. 25, 2023

(65) Prior Publication Data

US 2023/0239674 A1 Jul. 27, 2023

(30) Foreign Application Priority Data

Jan. 27, 2022 (JP) ................................ 2022-010771

(51) Int. Cl.
| | | |
|---|---|---|
| *H04W 8/00* | (2009.01) | |
| *G06F 3/0484* | (2022.01) | |
| *G06F 3/0488* | (2022.01) | |
| *H04W 4/80* | (2018.01) | |

(52) U.S. Cl.
CPC .......... *H04W 8/005* (2013.01); *G06F 3/0484* (2013.01); *G06F 3/0488* (2013.01); *H04W 4/80* (2018.02)

(58) Field of Classification Search
CPC ......... H04W 4/80; H04W 8/005; H04W 8/00; G06F 3/0484; G06F 3/0488
See application file for complete search history.

(56) References Cited

U.S. PATENT DOCUMENTS

| | | | |
|---|---|---|---|
| 11,224,003 B2 * | 1/2022 | Abe ..................... | H04W 8/005 |
| 11,284,460 B2 | 3/2022 | Hada et al. | |
| 11,950,303 B2 | 4/2024 | Hada et al. | |
| 2013/0265935 A1 | 10/2013 | Matsuda | |

(Continued)

FOREIGN PATENT DOCUMENTS

| | | |
|---|---|---|
| JP | 2012244274 | 12/2012 |
| JP | 2013-219430 A | 10/2013 |
| JP | 2021111962 | 8/2021 |

*Primary Examiner* — Tuan H Nguyen
(74) *Attorney, Agent, or Firm* — WORKMAN NYDEGGER

(57) ABSTRACT

An information processing device wirelessly communicates with an electronic device via a wireless communication unit and includes a search result acquisition unit, an input information acquisition unit, a direction information acquisition unit, and a controller. The search result acquisition unit acquires information of a search result about the electronic device. The input information acquisition unit acquires input information inputted as a direction of the electronic device that is a connection target, in relation to the information processing device. The direction information acquisition unit acquires direction information representing a direction in which the electronic device exists, by short-range wireless communication with the electronic device. The controller executes processing of specifying the electronic device corresponding to the input information from among the electronic devices found by the search, based on the direction of the direction information and the direction of the input information, and connecting to the specified electronic device.

10 Claims, 13 Drawing Sheets

(56) References Cited

U.S. PATENT DOCUMENTS

| | | | |
|---|---|---|---|
| 2020/0278437 A1* | 9/2020 | Kato | .................... G01S 5/0242 |
| 2021/0219361 A1 | 7/2021 | Hada et al. | |
| 2022/0174765 A1 | 6/2022 | Hada et al. | |

* cited by examiner

FIG. 13
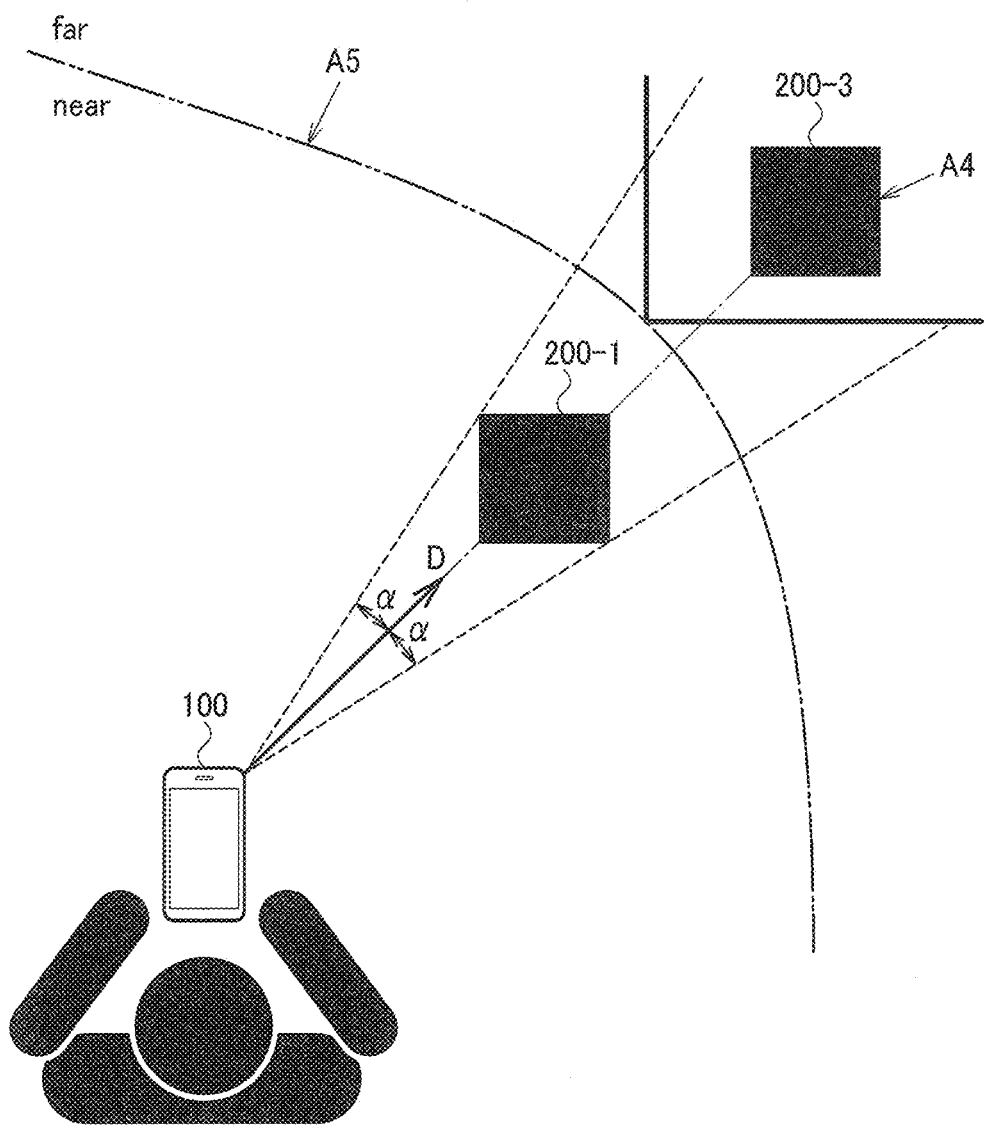
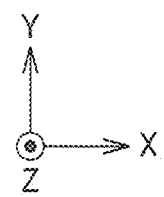

INFORMATION PROCESSING DEVICE AND NON-TRANSITORY COMPUTER-READABLE STORAGE MEDIUM STORING PROGRAM

The present application is based on, and claims priority from JP Application Serial Number 2022-010771, filed Jan. 27, 2022, the disclosure of which is hereby incorporated by reference herein in its entirety.

BACKGROUND

1. Technical Field

The present disclosure relates to an information processing device and a non-transitory computer-readable storage medium storing a program, or the like.

2. Related Art

According to the related art, an electronic device that can be connected via wireless communication in a plurality of connection modes is known. However, manually setting a proper connection mode puts a heavy burden on the user. JP-A-2013-219430 discloses a technique of automatically connecting an information processing device and an electronic device in a proper connection mode.

However, in the technique of JP-A-2013-219430, when a plurality of electronic devices that can be a connection target exist in the surroundings, an electronic device other than a desired electronic device may be automatically connected to the information processing device. Also, JP-A-2013-219430 does not disclose a technique of specifying a desired electronic device in consideration of input information from the user.

SUMMARY

An aspect of the present disclosure relates to an information processing device wirelessly communicating with an electronic device via a wireless communication unit. The information processing device includes: a search result acquisition unit acquiring information of a search result about the electronic device by a search via the wireless communication unit; an input information acquisition unit acquiring input information inputted as a direction of the electronic device that is a connection target, in relation to the information processing device; a direction information acquisition unit acquiring direction information representing a direction in which the electronic device exists, by short-range wireless communication with the electronic device via the wireless communication unit; and a control unit executing processing of specifying the electronic device corresponding to the input information from among the electronic devices found by the search, based on the direction of the direction information and the direction of the input information, and connecting to the specified electronic device.

Another aspect of the present disclosure relates to a non-transitory computer-readable storage medium storing a program. The program causes an information processing device wirelessly communicating with an electronic device via a wireless communication unit to function. The program causes a computer to function as: a search result acquisition unit acquiring information of a search result about the electronic device by a search via the wireless communication unit; an input information acquisition unit acquiring input information inputted as a direction of the electronic device that is a connection target, in relation to the information processing device; a direction information acquisition unit acquiring direction information representing a direction in which the electronic device exists, by short-range wireless communication with the electronic device via the wireless communication unit; and a control unit executing processing of specifying the electronic device corresponding to the input information from among the electronic devices found by the search, based on the direction of the direction information and the direction of the input information, and connecting to the specified electronic device.

BRIEF DESCRIPTION OF THE DRAWINGS

FIG. 1 explains an example of the configuration of an information processing device, or the like.

FIG. 13 explains a technique in another modification example.

DESCRIPTION OF EXEMPLARY EMBODIMENTS

An embodiment will now be described. However, the embodiment described below should not unduly limit the contents of the present disclosure described in the claims. Not all the components described in the embodiment are necessarily essential components of the present disclosure.

Figure 1:
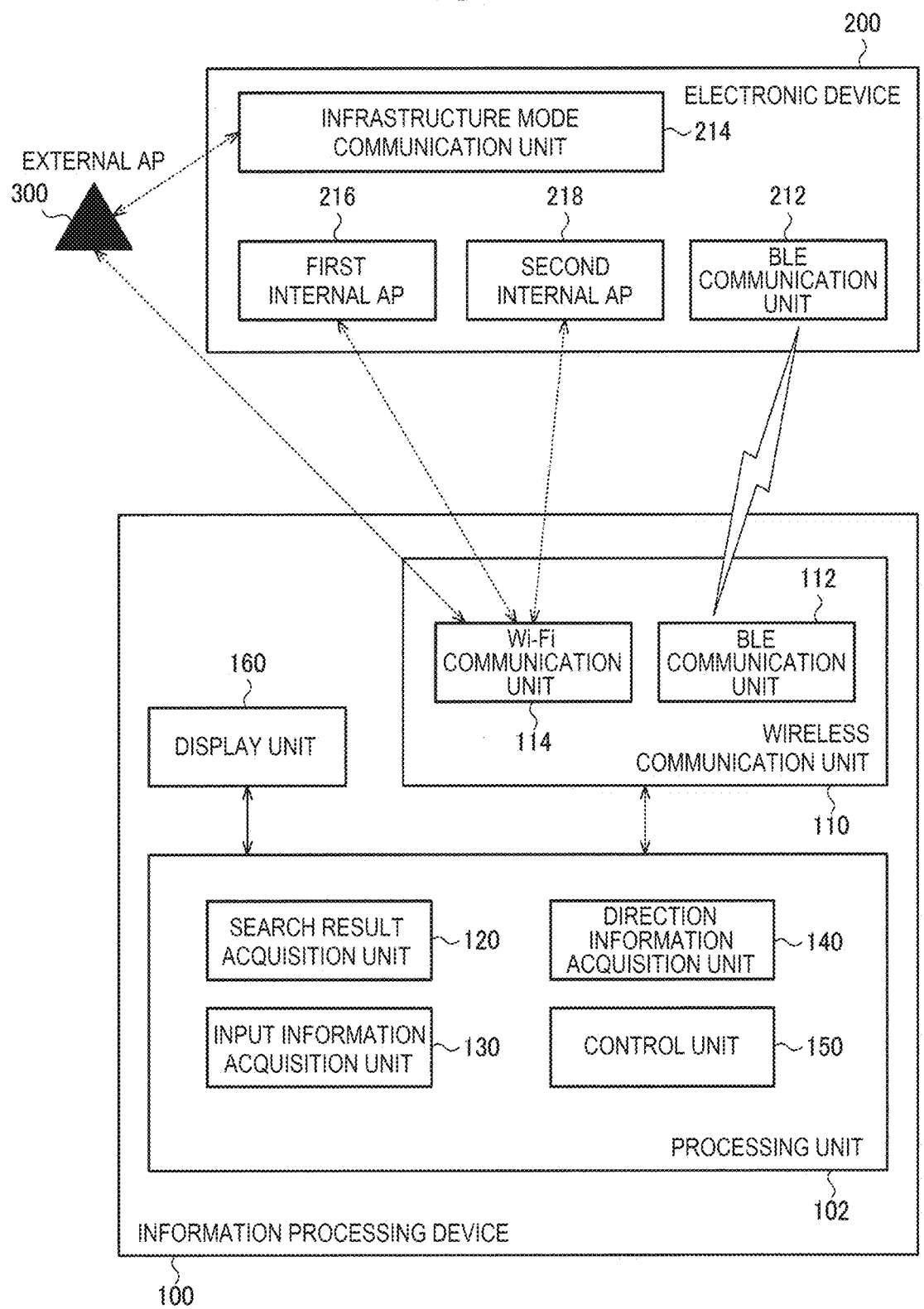

FIG. 1 is a block diagram explaining an example of the configuration of a system including an information processing device 100 and an electronic device 200 according to this embodiment. The information processing device 100 includes a processing unit 102, a wireless communication unit 110, and a display unit 160. The information processing device 100 wirelessly communicates with the electronic device 200 via the wireless communication unit 110. However, the information processing device 100 in this embodiment is not limited to the configuration shown in FIG. 1 and can be implemented with various modifications such as omitting a part of the components thereof or adding another component. The another component is, for example, an operation unit, a memory or the like. The display unit 160 is formed of a display or the like displaying various kinds of information to a user and can be implemented, for example, by a liquid crystal display, an organic EL display, a dot matrix LED or the like. Also, the display unit 160 and an operation unit, not illustrated, can be formed as an integrated piece of hardware, for example, in the form of a touch panel. The type of the touch panel may be, for example a projected capacitance type but may also be a resistive film type, an infrared shielding type or the like and is not particularly limited. The information processing device 100 in this embodiment is, for example, a portable information terminal such as a smartphone but may also be a personal computer or the like. The electronic device 200 is, for example, a printer but may also be a scanner, a personal computer, a wearable device, a biological information measuring device, a robot, a video device, or a physical quantity measuring device or the like. The wearable device refers to a smartwatch or an activity tracker or the like. The biological information measuring device refers to a pulsimeter or a pedometer or the like. The video device refers to a camera or a projector or the like. The physical quantity measuring device refers to a thermometer or a weight scale or the like. The printer in this example includes a multifunction peripheral. The multifunction peripheral refers to a printer including other functions than a printer function. The other functions than the printer function include a copy function, a facsimile function, or a scanner function or the like, and may also be other functions. The configuration of the system including the information processing device 100 and the electronic device 200 according to the embodiment is not limited to the example shown in FIG. 1. For example, the information processing device 100 may wirelessly communicate with a plurality of electronic devices 200, and the electronic device 200 may wirelessly communicate with a plurality of information processing devices 100.

The processing unit 102 controls the input and output of data from and to each unit including the wireless communication unit 110. The processing unit 102 executes various kinds of computational processing, for example, based on a predetermined program read out from a memory, not illustrated, an operation input signal from an operation unit, not illustrated, or various data or the like received via the wireless communication unit 110, and controls a display output operation to the display unit 160 or a data output operation to the electronic device 200, or the like. The predetermined program refers to, for example, basic software such as an OS (operating system), various application programs operating based on the basic software, or both of these, or the like.

The processing unit 102 can be implemented by a processor. That is, each processing in this embodiment can be implemented by a processor operating based on information such as a program, and a memory, not illustrated, storing information such as a program. The processor may be, for example, individual pieces of hardware implementing functions of individual units or may be a unified piece of hardware implementing functions of individual units. For example, the processor includes hardware and the hardware can include at least one of a circuit processing a digital signal and a circuit processing an analog signal. For example, the processor can also be formed of one or a plurality of circuit devices or one or a plurality of circuit elements installed on a circuit board. The processor may be, for example, a CPU (central processing unit). However, the processor is not limited to a CPU. Various processors such as a GPU (graphics processing unit) or a DSP (digital signal processor) can be used. The processor may also be a hardware circuit formed of an ASIC. The processor may also include an amplifier circuit and a filter circuit or the like that process an analog signal.

The processing unit 102 in this embodiment includes a search result acquisition unit 120, an input information acquisition unit 130, a direction information acquisition unit 140, and a control unit 150, descried later. That is, the information processing device 100 in this embodiment includes the search result acquisition unit 120, the input information acquisition unit 130, the direction information acquisition unit 140, and the control unit 150. For example, the processing unit 102 reads out and executes an application program of a connection application, described later, from a memory, not illustrated, and thus implements the functions of the search result acquisition unit 120, the input information acquisition unit 130, the direction information acquisition unit 140, and the control unit 150. When the operation of this application program needs basic software that serves as a base, the processing unit 102 may read out the program of the basic software from the memory, not illustrated, and thus may be able to implement a function, for example, as the control unit 150.

The wireless communication unit 110 is a communication interface performing wireless communication conforming to a predetermined wireless communication standard. The wireless communication unit 110 can be implemented, for example, by hardware for communication such as an ASIC (application-specific integrated circuit) for communication or a processor for communication, and firmware for communication or the like. In this embodiment, the control unit 150, described later, performs communication control processing such as transmission processing and reception processing for information, to the wireless communication unit 110, and thus enables the wireless communication unit 110 to transmit information to an external device such as the electronic device 200 and to receive information from the external device. As the predetermined wireless communication standard, a plurality of types may be employed. That is, the wireless communication unit 110 includes hardware and firmware for communication or the like corresponding to a desired wireless communication standard.

The wireless communication unit 110 can perform wireless communication conforming to a short-range wireless communication standard such as Bluetooth (trademark registered), as the predetermined wireless communication standard. In this embodiment, Bluetooth includes BLE (Bluetooth Low Energy) and may be simply referred to as BLE in the description below. For example, as shown in FIG. 1, the wireless communication unit 110 of the information processing device 100 in this embodiment includes a BLE communication unit 112 and the electronic device 200 includes a BLE communication unit 212. Thus, BLE communication can be implemented between the information processing device 100 and the electronic device 200. The BLE communication unit 112 or the like in this embodiment is in conformity with the standard of Bluetooth from version 5.1 onward. In other words, each unit included in the information processing device 100 and the electronic device 200 in this embodiment is in conformity with the standard of Bluetooth from version 5.1 onward.

The wireless communication unit 110 can also perform wireless communication conforming to, for example, Wi-Fi (trademark registered) as the predetermined wireless communication standard, in a predetermined connection mode. The predetermined connection mode is, for example, a Wi-Fi infrastructure mode. That is, as shown in FIG. 1, for example, the wireless communication unit 110 of the information processing device 100 includes a Wi-Fi communication unit 114 and the electronic device 200 includes an infrastructure mode communication unit 214. Thus, communication in the Wi-Fi infrastructure mode can be implemented via an external access point 300. In the description and illustrations below, an access point may be referred to as AP. For example, the external access point 300 periodically broadcasts a wireless communication radio wave such as a beacon in such a way that the identification information of the external access point 300 can be deciphered, and connection in the Wi-Fi infrastructure mode is established by a technique, described later. The identification information of the external access point 300 is, for example, an SSID (service set identifier). In the description below, "communication connection conforming to a communication standard" is simply referred to as "connection", where appropriate. An access point can also be referred to as a router. In the case where communication in the Wi-Fi infrastructure mode has been established, connection with the external access point 300 is automatically established even if the communication is temporarily disconnected.

The predetermined connection mode may also be a Wi-Fi Direct (trademark registered) mode. In the description and illustrations below, Wi-Fi Direct may be referred to as direct connection. For example, as shown in FIG. 1, the wireless communication unit 110 of the information processing device 100 includes the Wi-Fi communication unit 114 and the electronic device 200 includes a first internal access point 216. Thus, direct connection can be implemented. That is, the electronic device 200 is the owner of a group where the information processing device 100 is a client, and the first internal access point 216 functions as a software access point. For example, the first internal access point 216 periodically broadcasts a wireless communication radio wave such as a beacon conforming to the direct connection standard. An advertisement packet of this wireless communication radio wave includes information such as an SSID that is the identification information of the first internal access point 216. The Wi-Fi communication unit 114 executes a scan to receive the wireless communication radio wave broadcast from the first internal access point 216. The scan in this case is a passive scan but may be an active scan. The Wi-Fi communication unit 114 makes a connection request to the first internal access point 216. A signal for this connection request includes information such as a password corresponding to the SSID of the first internal access point 216. This enables the connection between the Wi-Fi communication unit 114 and the first internal access point 216. After communication via direct connection is established and this communication is temporarily disconnected, the user may be requested to configure a connection setting again for the reason that the encryption key is changed, or the like.

The wireless communication unit 110 may also perform temporary connection that is temporary wireless communication connection to configure a wireless connection setting to the electronic device 200. For example, as shown in FIG. 1, the wireless communication unit 110 of the information processing device 100 includes the Wi-Fi communication unit 114 and the electronic device 200 includes a second internal access point 218. Thus, temporary connection can be implemented. For example, when the user installs a connection application program for connecting to the electronic device 200 into the information processing device 100, connection setting information for connecting to the second internal access point 218 of the electronic device 200 is stored in a memory, not illustrated. The identification information of the second internal access point 218 may be common to a plurality of electronic devices 200. When the user starts this connection application, an indication that the power of the electronic device 200 that is the connection target is to start is displayed on the display unit 160. When the user starts the power of the electronic device 200 that is the connection target, the second internal access point 218 starts and periodically broadcasts a predetermined wireless communication radio wave conforming to the Wi-Fi standard. The Wi-Fi communication unit 114 executes a scan to receive the wireless communication radio wave broadcast from the second internal access point 218. The scan in this case is a passive scan but may be an active scan. The Wi-Fi communication unit 114 makes a connection request to the second internal access point 218, based on the foregoing setting information that is stored already. Thus, when the user starts this connection application, a temporary wireless communication channel is automatically established between the information processing device 100 and the electronic device 200 and temporary connection can be implemented.

When the user wants to use, for example, direct connection using the first internal access point 216, the user configures a setting to receive information such as the SSID of the first internal access point 216 from the electronic device 200, or the like, on the screen of this connection application. Thus, the temporary connection is disconnected and direct connection is established. Meanwhile, when the user wants to use, for example, wireless connection in the Wi-Fi infrastructure mode, the user configures a setting to input information such as the SSID of the desired external access point 300 and transmit this information to the electronic device 200, on the screen of this connection application. Thus, the temporary connection is disconnected and wireless connection in the Wi-Fi infrastructure mode is established. In this way, the user can easily configure an initial setting for wireless communication connection to the electronic device 200.

The above description does not preclude the inclusion of other wireless connection modes such as an ad-hoc mode, and a connection mode based on wired communication or the like, as the predetermined connection mode. At each electronic device 200, the predetermined connection mode can be arbitrarily enabled or disabled. For example, the user can enable only the Wi-Fi infrastructure mode between the information processing device 100 and the electronic device 200. However, in this case, the user inputs necessary information for the connection between each of the information processing device 100 and the electronic device 200, and the external access point 300, to establish the connection. This puts a heavy burden on the user. Also, for example, the user can enable only the direct connection between the information processing device 100 and the electronic device 200. However, in this case, the user inputs necessary information for the connection to the first internal access point 216 each time to establish the connection. This puts a heavy burden on the user.

The search result acquisition unit 120 acquires information of a search result about the electronic device 200 by a search via the wireless communication unit 110. Specifically, for example, the BLE communication unit 212 of the electronic device 200 broadcasts an advertisement packet of the BLE. The control unit 150 operating as the basic software transmits the information of the search result to the search result acquisition unit 120, based on the identification information or the like of the electronic device 200 included in the advertisement packet received via the BLE communication unit 112. The control unit 150 may also transmit the information of the search result to the search result acquisition unit 120, based on the identification information or the like of the electronic device 200 included in the advertisement packet received via the Wi-Fi communication unit 114.

The input information acquisition unit 130 acquires input information inputted as the direction of the electronic device 200 that is the connection target, in relation to the information processing device 100. The acquisition of the input information can be implemented, for example, by a technique described below. For example, though not illustrated, it is assumed that the information processing device 100 includes a plurality of operation buttons arranged in the form of a matrix. The control unit 150 generates input information as the direction information of the electronic device 200, based on a combination of operation buttons pressed by the user, and transmits this input information to the input information acquisition unit 130. Also, for example, when the display unit 160 is the foregoing touch panel, the control unit 150 may generate direction information of the electronic device 200, based on a predetermined operation input performed by the user to the display unit 160, then transmit this direction information to the input information acquisition unit 130, and thus implement the acquisition of the input information. The predetermined operation input is, for example, a swipe operation or a flick operation but is not limited to these and may also be a tap operation, a drag operation, a pinch-in operation or the like. The predetermined operation input is not particularly limited, provided that it is supported by the touch panel forming the display unit 160.

The direction information acquisition unit 140 acquires direction information representing the direction in which the electronic device 200 exists, based on the short-range wireless communication with the electronic device 200 via the wireless communication unit 110. The acquisition of the direction information can be implemented, for example, by a technique described below. For example, it is assumed that the BLE communication unit 212 of the electronic device 200 broadcasts a BLE advertisement packet, as described above, and that the BLE communication unit 112 receiving this advertisement packet includes a plurality of reception antennas. In this case, the advertisement packet reaches the individual reception antennas with a time difference. Therefore, the angle of arrival AOA of the radio wave can be estimated, based on a first computation technique using the distance between the individual antennas and the wavelength of the radio wave, which are known. The technique for estimating the angle of arrival AOA including the first computation technique is known and therefore is not described further in detail here.

The acquisition of the direction information may also be implemented, for example, by a technique described below. The electronic device 200 includes a plurality of transmission antennas and broadcasts a BLE advertisement packet while shifting the timing of transmitting the radio wave from each transmission antenna. In this case, this advertisement packet includes information of the timing when each transmission antenna transmits the advertisement packet and distance information between the individual transmission antennas. The BLE communication unit 112 can estimate the angle of departure AOD of the radio wave, based on a second computation technique using the phase difference between the advertisement packets received from the individual transmission antennas, and the information of the transmission timing and the distance information between the transmission antennas included in the advertisement packet. The technique for estimating the angle of departure AOD including the second computation technique is known and therefore is not described further in detail here.

Figure 2:
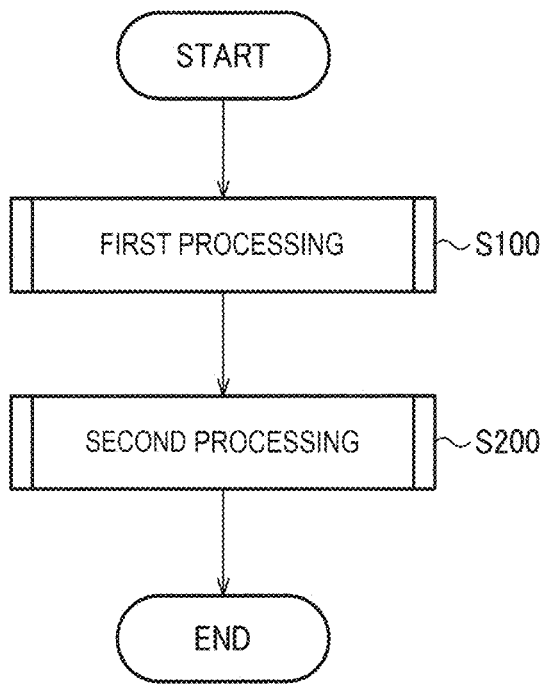
FIG. 2 is a flowchart explaining an example of processing by the information processing device.

The control unit 150 executes processing of specifying the electronic device 200, based on the information of the search result, the direction information, and the input information, and connecting to the specified electronic device 200, by a technique described later with reference to FIG. 2 and onward. For example, the control unit 150 functions as the foregoing connection application and thus can implement the processing of specifying the electronic device 200 and the processing of connecting to the specified electronic device 200. The control unit 150 may also function as basic software or the like serving as the base for this connection application. The function as the basic software or the like is, for example, a function of converting the input information into the direction information used on the connection application, for example, based on azimuth information acquired via a geomagnetic sensor or a gyro sensor or the like, not illustrated. The function as the basic software or the like may also be a function of converting various kinds of information of the electronic device 200 included in the BLE advertisement packet into the form of a corresponding icon on the connection application, or the like, as described later.

An example of processing relating to the connection application by the information processing device 100 in this embodiment will now be described, using the flowcharts of FIGS. 2, 3 and 4. The information processing device 100 generates timer interrupt processing, for example, every predetermined time from the timing when the user starts the program of the connection application, and thus repeatedly executes each processing. However, this is not limiting. The information processing device 100 may repeatedly execute each processing, for example, as loop processing. As shown in FIG. 2, the information processing device 100 executes first processing (step S100) described later with reference to FIG. 3 and subsequently executes second processing (step S200) described later with reference to FIG. 4. That is, in the case of the processing example shown in FIGS. 2 to 4, a predetermined waiting time to complete the first processing (step S100) is generated before the second processing (step S200) is executed.

Figure 3:
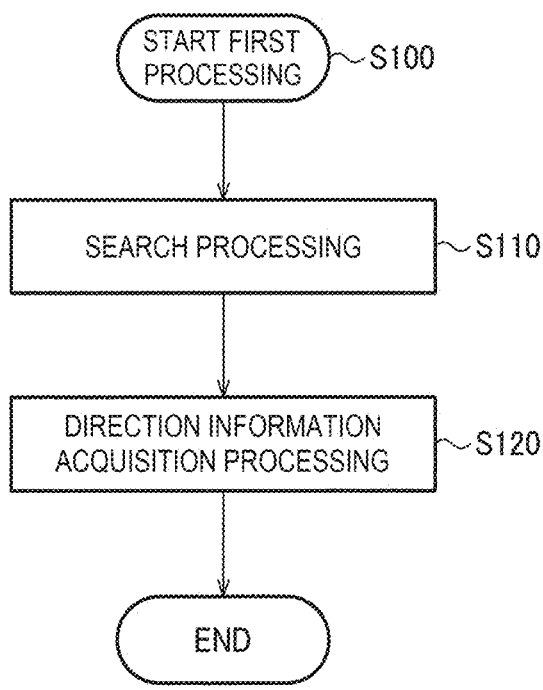
FIG. 3 is a flowchart explaining a processing example of first processing.

FIG. 3 is a flowchart showing a detailed processing example of the first processing (step S100). The information processing device 100 first executes search processing (step S110). For example, when the information processing device 100 and the electronic device 200 perform wireless communication conforming to the BLE standard, the identification information of the electronic device 200 is included in the advertisement packet and the BLE communication unit 112 of the information processing device 100 receives this advertisement packet. Thus, the search processing (step S110) can be implemented. The identification information of the electronic device 200 is specifically, for example, the MAC address of the electronic device 200 stored in a payload of a protocol data unit in the advertisement packet, but may be other information that is interconvertible with the MAC address, such as the serial number. In this embodiment, the payload may further include other information. This other information is, for example, information of radio wave intensity, information representing the state of the electronic device 200, or the like. Details thereof will be described later.

When, for example, the information processing device 100 is connected to the external access point 300 by the Wi-Fi infrastructure mode, the wireless communication unit 110 may search for the electronic device 200 on a network formed by the external access point 300. More specifically, for example, the wireless communication unit 110 transmits a response request packet designating a broadcast address or a link local multicast address, to the electronic device 200. The response request packet is a packet requesting a device receiving this response request packet to send back a response packet including the identification information of this device. The infrastructure mode communication unit 214 or the like of the electronic device 200 sends back a response packet including the identification information such as the SSID of the electronic device 200, to the information processing device 100. Thus, the search processing (step S110) can be implemented.

Subsequently, the information processing device 100 executes direction information acquisition processing (step S120). For example, when the wireless communication unit 110 receives an advertisement packet conforming to the BLE standard from the electronic device 200, the control unit 150 calculates the angle of arrival AOA or the angle of departure AOD that is estimated. The control unit 150 then executes processing of converting the angle of arrival AOA or the angle of departure AOD into direction information corresponding to the connection application, described later, and transmits the direction information to the direction information acquisition unit 140. Thus, the direction information acquisition processing (step S120) can be implemented. The direction information corresponding to the connection application is a relative azimuth angle in relation to the information processing device 100 as a reference point, but may be converted into, for example, angle information corresponding to an absolute azimuth.

Figure 4:
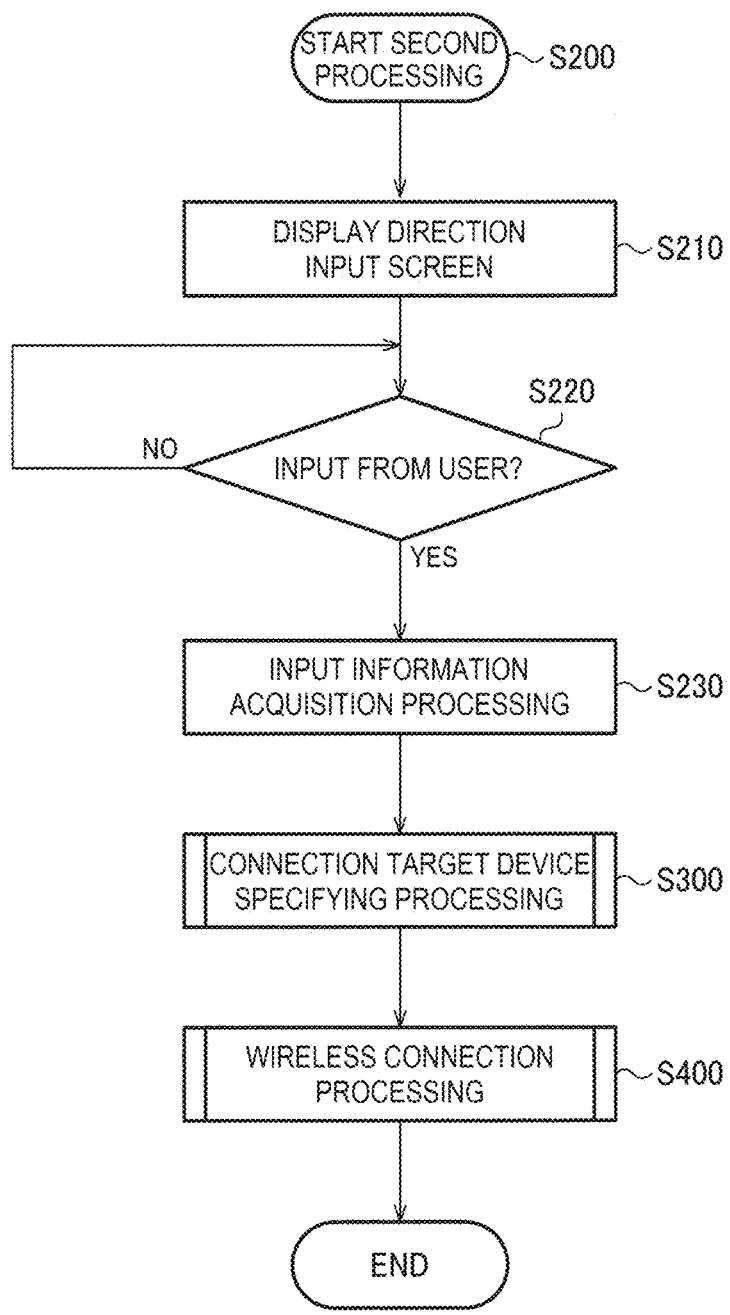
FIG. 4 is a flowchart explaining a processing example of second processing.

FIG. 4 is a flowchart showing a detailed processing example of the second processing (step S200). The information processing device 100 executes processing of displaying a direction input screen (step S210) described later with reference to FIG. 8 and subsequently executes processing of determining whether there is an input from the user or not (step S220). When the input information acquisition unit 130 acquires input information based on an operation input by the user with an operation button as described above, step S210 may be omitted.

When the information processing device 100 has determined that there is an input from the user (YES in step S220), the information processing device 100 executes input information acquisition processing (step S230). Specifically, for example, the information processing device 100 executes processing in which the input information acquisition unit 130 acquires input information based on an input operation by the user with the operation button, the touch panel or the like. Meanwhile, when the information processing device 100 has determined that there is no input from the user (NO in step S220), the information processing device 100 executes the processing of step S220 again.

After executing the input information acquisition processing (step S230), the information processing device 100 executes connection target device specifying processing (step S300). Specifically, for example, the control unit 150 executes processing of determining whether the direction information acquired in the direction information acquisition processing (step S120) in the connection application is the same as the direction information based on the input information acquired in the input information acquisition processing (step S230) or not. The "same" in this case may include "substantially the same". Although not illustrated in any flowchart, processing of determining that it is an error when it is determined that the direction information acquired in the direction information acquisition processing (step S120) is not the same as the direction information based on the input information acquired in the input information acquisition processing (step S230) may be added. The connection target device specifying processing (step S300) may be executed as shown in processing described later with reference to FIG. 6.

Subsequently, the information processing device 100 executes wireless connection processing (step S400). In this processing, which will be described in detail later with reference to FIG. 8, the control unit 150 executes connection processing of connecting the electronic device 200 specified in the connection target device specifying processing (step S300) to the information processing device 100 according to the circumstance. Thus, the user can connect a desired electronic device 200 and the information processing device 100 in a desired connection mode. When it is an error in the input information acquisition processing (step S230), the information processing device 100 may omit the wireless connection processing (step S400).

As described above, the information processing device 100 in this embodiment wirelessly communicates with the electronic device 200 via the wireless communication unit 110 and includes the search result acquisition unit 120, the input information acquisition unit 130, the direction information acquisition unit 140, and the control unit 150. The search result acquisition unit 120 acquires information of a search result about the electronic device 200 by a search via the wireless communication unit 110. The input information acquisition unit 130 acquires input information inputted as a direction of the electronic device 200 that is a connection target, in relation to the information processing device 100. The direction information acquisition unit 140 acquires direction information representing a direction in which the electronic device 200 exists, by short-range wireless communication with the electronic device 200 via the wireless communication unit 110. The control unit 150 executes processing of specifying the electronic device 200 corresponding to the input information from among the electronic devices 200 found by the search, based on the direction of the direction information and the direction of the input information, and connecting to the specified electronic device 200.

Figure 5:
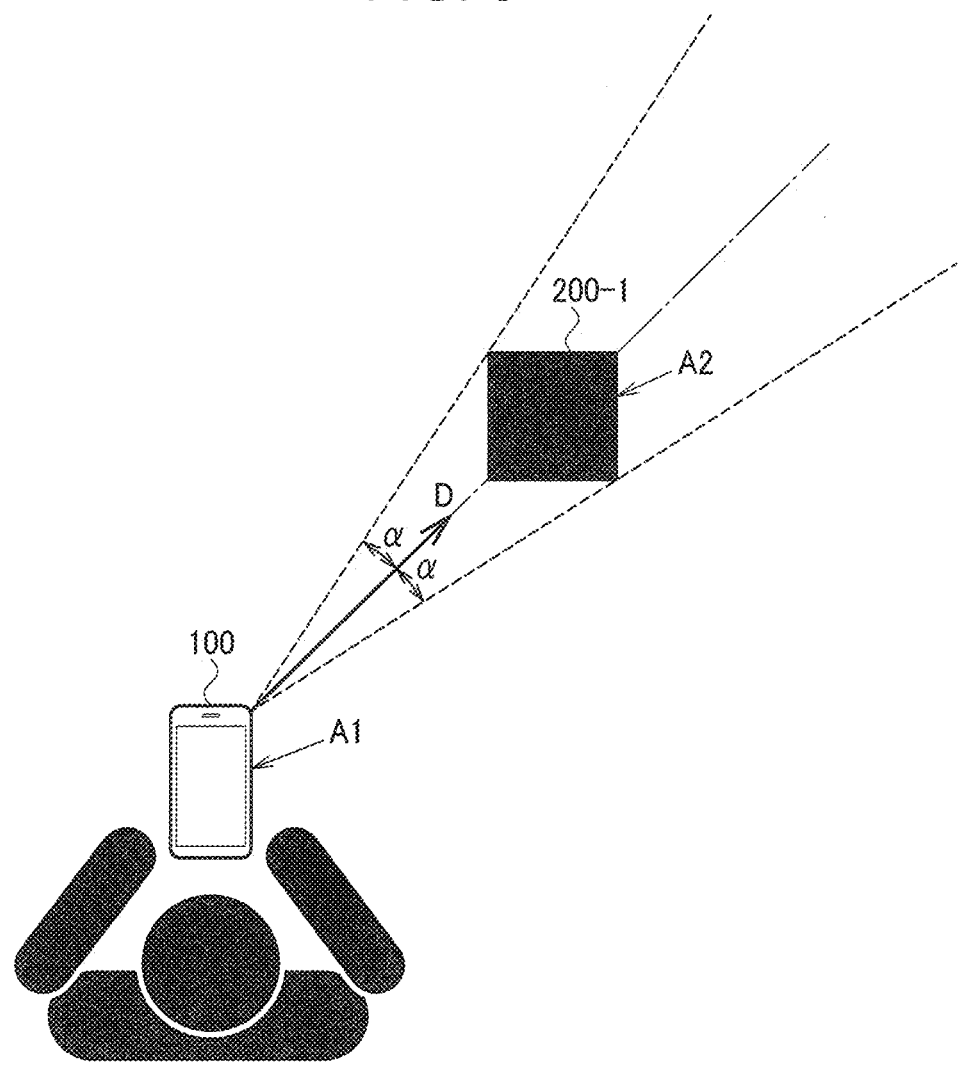
FIG. 5 explains a predetermined angle range.

In this way, the information processing device 100 in this embodiment includes the wireless communication unit 110, the search result acquisition unit 120, and the direction information acquisition unit 140 and therefore can acquire a search result about the electronic device 200 via wireless communication and include direction information in the search result. Thus, the user can grasp further details about the electronic device 200 found by the search. Also, the information processing device 100 in this embodiment further includes the input information acquisition unit 130 and therefore can acquire input information based on an input operation by the user. Also, the information processing device 100 in this embodiment further includes the control unit 150 and therefore can connect to the electronic device 200 that is properly specified, based on the direction of the direction information and the direction of the input information. For example, in a predetermined circumstance, the information processing device 100 may execute processing equivalent to the wireless connection processing (step S400) to connect to the electronic device 200 other than the desired electronic device 200. The predetermined circumstance is, for example, a circumstance where the information processing device 100 is located at a location indicated by A1, an electronic device 200-1 is located at a location indicated by A2, and an electronic device 200-2 is located at a location indicated by A3, as shown in FIG. 5, but the user does not recognize the existence of the electronic device 200-2 for a predetermined reason. The predetermined reason is the carelessness of the user but may also be, for example, the existence of a predetermined wall or a partition or the like, as shown in FIG. 5. In FIG. 5, three axes orthogonal to each other are illustrated, that is, an X-axis, a Y-axis, and a Z-axis. A direction along the X-axis may be referred to as an "X-axis direction". A direction along the Y-axis may be referred to as a "Y-axis direction". A direction along the Z-axis may be referred to as a "Z-axis direction". This also applies to FIG. 9, which will be described later. In this embodiment, a plane formed by the X-axis and the Y-axis is defined as a horizontal plane. In FIG. 5, it is assumed that the information processing device 100 faces the horizontal plane, that is, a direction parallel to the XY plane. That is, it is assumed that the component in the Z-axis direction of a direction D shown in FIG. 5 is zero.

It is assumed that the electronic device 200-1 is located at a location in the direction D from the information processing device 100 and that the electronic device 200-2 is located at a location in a direction that is different from the direction D, as shown in FIG. 5. The direction in which the electronic device 200-2 is located may be not the direction at the back of the user as shown in FIG. 5, provided that this direction is different from the direction D. The user starts the connection application to connect the information processing device 100 and the electronic device 200-1 and turns on the power of the electronic device 200-1, based on an instruction from the connection application. At this point, for example, the power of the electronic device 200-2 located at A3 may be turned on at the same timing as the timing when the user turns on the power of the electronic device 200-1. The "same timing" in this case includes "substantially the same timing". According to the related-art technique, the information processing device 100 cannot distinguish the electronic device 200-1 and the electronic device 200-2 and therefore may perform temporary connection based on an advertisement packet broadcast by the second internal access point 218 of the electronic device 200-2. Therefore, if careless about this, the user may connect, by mistake, the electronic device 200-2, which is the electronic device 200 that is not originally scheduled to be connected, and the information processing device 100. When the electronic device 200-2 and the information processing device 100 are connected by direct connection, the user cannot connect the electronic device 200-1, which is the electronic device 200 that is originally scheduled to be connected, and the information processing device 100. Therefore, the user carries the burden of disconnecting this direct connection once.

Also, for example, a technique of specifying a desired electronic device 200 from among the electronic devices 200 found in the search processing (step S110), using distance information based on wireless communication radio wave intensity, which will be described later, is conceivable. However, the electronic device 200-1, which is the desired electronic device 200, is not necessarily located at the nearest location from the user. The technique of specifying the electronic device 200 located at the shortest distance from the information processing device 100, as a connection target, is not an appropriate technique.

In this respect, by applying the technique according to this embodiment, the information processing device 100 acquires input information equivalent to the direction D by the input information acquisition processing (step S230) and specifies the electronic device 200-1 located at a location in the direction D by the connection target device specifying processing (step S300). Thus, the information processing device 100 automatically connects the electronic device 200-1 and the information processing device 100 by the wireless connection processing (step S400). Therefore, the user can connect the desired electronic device 200 and the information processing device 100 securely and easily.

The technique according to this embodiment may also be implemented as a program. That is, the program in this embodiment causes the information processing device 100 wirelessly communicating with the electronic device 200 via the wireless communication unit 110 to function. The program causes a computer to function as the search result acquisition unit 120, the input information acquisition unit 130, the direction information acquisition unit 140, and the control unit 150. The search result acquisition unit 120 acquires information of a search result about the electronic device 200 by a search via the wireless communication unit 110. The input information acquisition unit 130 acquires input information inputted as a direction of the electronic device 200 that is a connection target, in relation to the information processing device 100. The direction information acquisition unit 140 acquires direction information representing a direction in which the electronic device 200 exists, by short-range wireless communication with the electronic device 200 via the wireless communication unit 110. The control unit 150 executes processing of specifying the electronic device 200 corresponding to the input information from among the electronic devices 200 found by the search, based on the direction of the direction information and the direction of the input information, and connecting to the specified electronic device 200. Such a configuration can achieve effects similar to those described above.

The technique according to the embodiment is not limited to the above and can be implemented with various modifications. For example, as described above, the connection target device specifying processing (step S300) may be executed as in a processing example shown in the flowchart of FIG. 6. Specifically, the control unit 150 may execute processing of determining whether the electronic device 200 is located within a predetermined range or not (step S310). The predetermined range is, for example, a range based on direction information in which a tolerance of an angle α is added to the direction D when input information equivalent to the direction D is acquired in the input information acquisition processing (step S230), as shown in FIG. 5. That is, the control unit 150 executes processing of determining whether the direction information searched out in the search processing (step S110) and acquired in the direction information acquisition processing (step S120) is within the tolerance range of the angle α from the direction D or not. When the control unit 150 has determined that the electronic device 200 is located within the predetermined range (YES in step S310), the control unit 150 executes processing of specifying this electronic device 200 as a connection target device (step S340) and ends the flow. In the example shown in FIG. 5, the electronic device 200-1 is located within the predetermined range. Therefore, the control unit 150 gives YES in the determination in step S310 and thus specifies the electronic device 200-1 as the electronic device 200 that is the connection target. Meanwhile, when the control unit 150 has determined that the electronic device 200 is not located within the predetermined range (NO in step S310), the control unit 150 executes processing of turning on an error flag (step S350) and ends the flow.

In this way, in the information processing device 100 in this embodiment, the control unit 150 executes the processing of specifying the electronic device 200-1 as a connection target when the electronic device 200-1 is located within the predetermined range including the inputted direction D, based on the direction information. Thus, the control unit 150 can specify the electronic device 200 more accurately. For example, in a predetermined circumstance, the direction information acquired by the direction information acquisition unit 140 may include a margin of error. The predetermined circumstance is, for example, a circumstance where the BLE signal includes a noise, or the like. In the predetermined circumstance, the direction information acquired in the direction information acquisition processing (step S120) may be not the same as the direction information based on the input information acquired in the input information acquisition processing (step S230). Therefore, an error may occur in the connection target device specifying processing (step S300) though the electronic device 200 is found in the search processing (step S110). In this respect, by applying the technique according to this embodiment, the control unit 150 can specify the electronic device 200 located within the predetermined range as the electronic device 200 that is the connection target, when the direction information acquired by the direction information acquisition unit 140 includes a margin of error. Thus, the occurrence of an unexpected error can be avoided.

A processing example of the wireless connection processing (step S400) will now be described, using the flowchart of FIG. 7. The control unit 150 executes processing of determining whether the error flag described above with reference to FIG. 6 is on or not (step S410). When the control unit 150 has determined that the error flag is on (YES in step S410), the control unit 150 executes error notification processing (step S420) and ends the flow. For example, the control unit 150 executes processing of displaying an error indication to the effect that the electronic device 200 is not found within the predetermined range, on the display unit 160, though not illustrated. That is, when the control unit 150 has determined that the direction according to the input information inputted by the user is different from the direction within the predetermined range, the control unit 150 does not execute the processing of step S430 and onward, described later, and does not connect the information processing device 100 and the electronic device 200. As described above, in the information processing device 100 in this embodiment, when the inputted direction is different from the direction within the predetermined range, the control unit 150 does not execute the processing of connecting to the electronic device 200. Thus, the situation where the electronic device 200 other than the desired electronic device 200 is connected to the information processing device 100 can be prevented.

Figure 6:
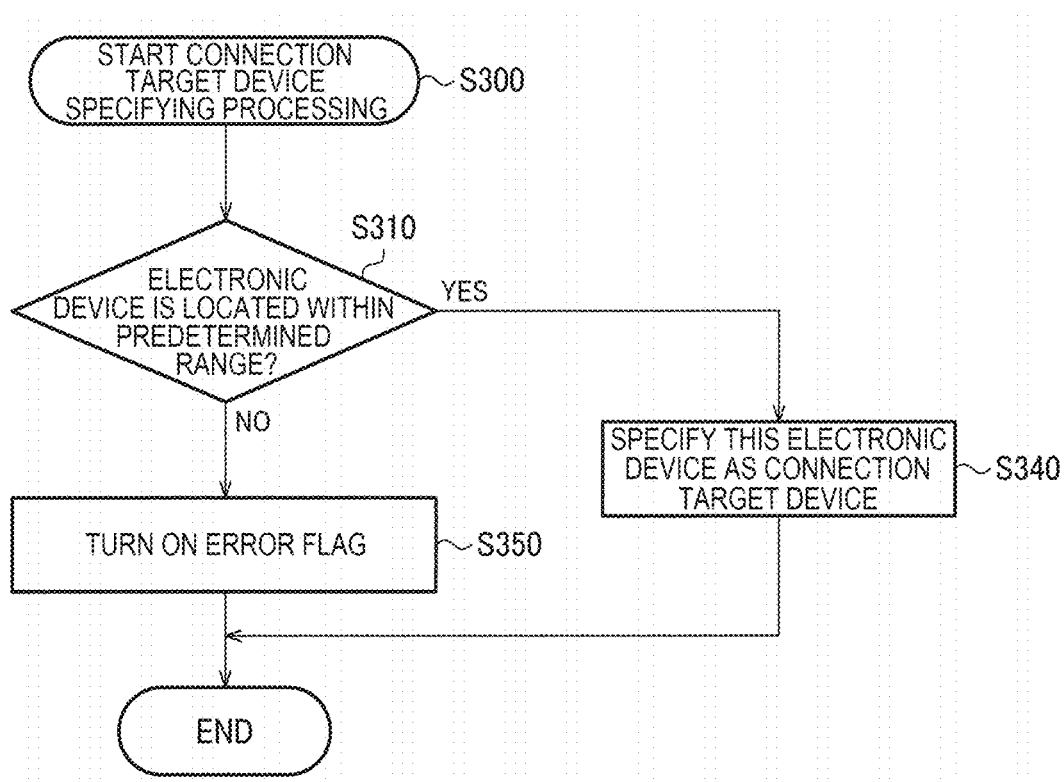
FIG. 6 is a flowchart explaining a processing example of connection target device specifying processing.

Meanwhile, when the control unit 150 has determined that the error flag is off (NO in step S410), the control unit 150 executes temporary connection processing (step S430). For example, after the user turns on the power of the electronic device 200, the electronic device 200 automatically starts the second internal access point 218, and the second internal access point 218 broadcasts a beacon signal. The control unit 150 executes processing of making a connection request to the second internal access point 218 via the BLE communication unit 112. The identification information or the like of the second internal access point 218 of the electronic device 200 specified in step S340 in FIG. 6 is stored in advance in the information processing device 100. Therefore, temporary connection between the information processing device 100 and the electronic device 200 is established via the second internal access point 218.

The control unit 150 then executes processing of determining whether the information processing device 100 is connected to the external access point 300 or not (step S440). When the control unit 150 has determined that the information processing device 100 is connected to the external access point 300 (YES in step S440), the control unit 150 executes processing of transmitting connection information to the electronic device 200 (step 450) and ends the flow. For example, the control unit 150 transmits necessary information for the connection of the external access point 300, such as the identification information or the like of the external access point 300, to the second internal access point 218 via the Wi-Fi communication unit 114. The electronic device 200 connects to the external access point 300. Thus, the information processing device 100 and the electronic device 200 belong to the network of the external access point 300 and connection in the infrastructure mode is established between the information processing device 100 and the electronic device 200. After the connection in the infrastructure mode is established, the temporary connection via the second internal access point 218 is disconnected and the second internal access point 218 does not start from then on.

Meanwhile, when the control unit 150 has determined that the information processing device 100 is not connected to the external access point 300 (NO in step S440), the control unit 150 executes processing of receiving connection information from the electronic device 200 (step S460). Subsequently, the control unit 150 executes processing of performing direct connection to the electronic device 200 (step S470) and ends the flow. For example, the control unit 150 executes processing of requesting the electronic device 200 to provide necessary information for connection to the first internal access point 216 of the electronic device 200, such as the identification information or the like of the first internal access point 216, via the Wi-Fi communication unit 114. The electronic device 200 then transmits the identification information or the like of the first internal access point 216 to the control unit 150 via the Wi-Fi communication unit 114. The Wi-Fi communication unit 114 connects to the first internal access point 216. Thus, direct connection between the information processing device 100 and the electronic device 200 is established. After the direct connection is established, the temporary connection via the second internal access point 218 is disconnected and the second internal access point 218 does not start from then on.

Figure 7:
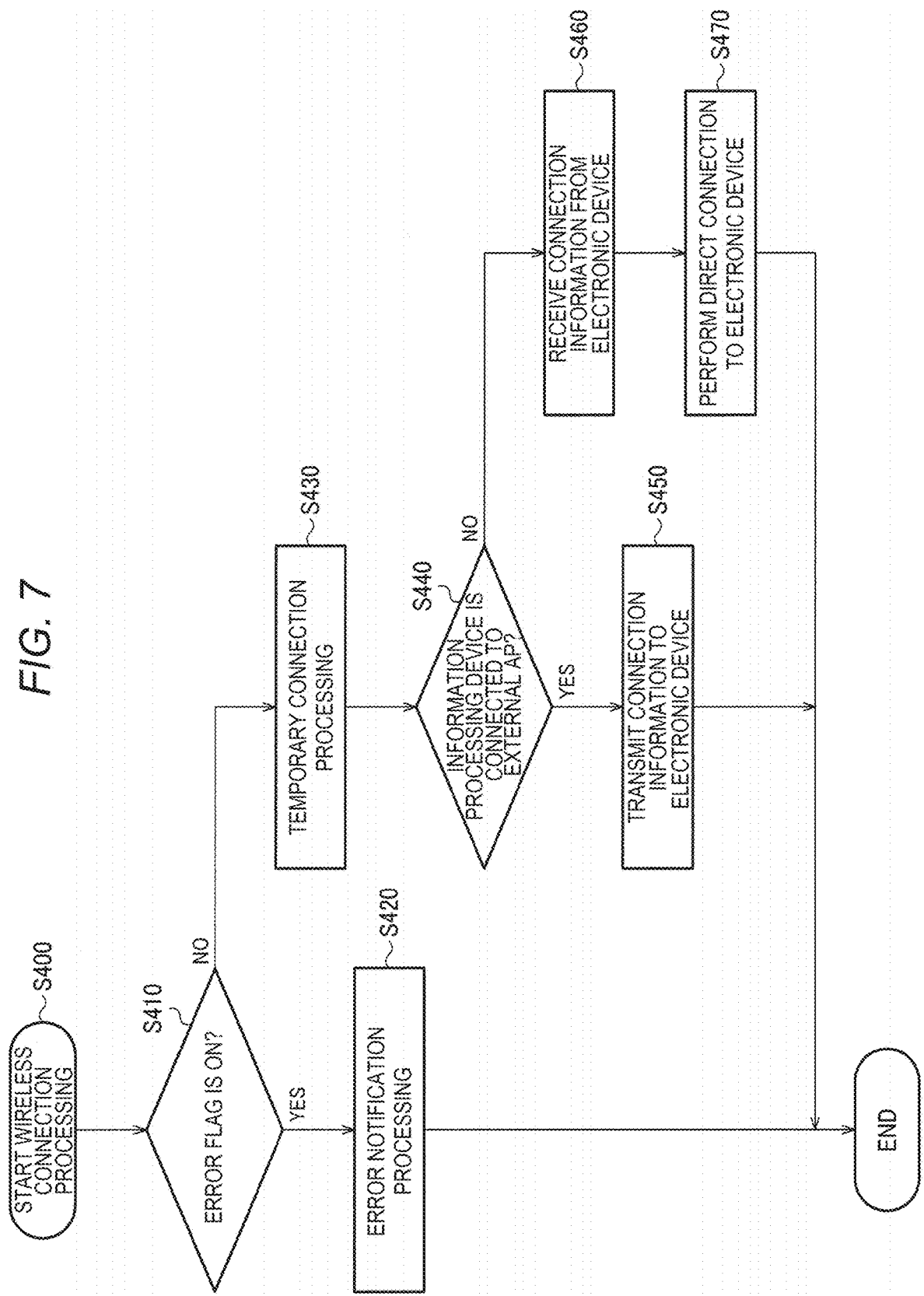
FIG. 7 is a flowchart explaining a processing example of wireless connection processing.

In this way, as the wireless connection processing (step S400) shown in FIG. 7 is executed, the user can easily connect the information processing device 100 and the electronic device 200 without performing a complicated operation about whether to connect the information processing device 100 and the electronic device 200 in the Wi-Fi infrastructure mode or by direct connection.

A specific screen example in the technique according to this embodiment will now be described, using FIG. 8. As the user starts the connection application program of the information processing device 100, the control unit 150 executes processing of displaying a screen indicated by B10 on the display unit 160. Specifically, for example, the control unit 150 executes processing of displaying an instruction to turn on the power of the electronic device 200 to be connected, as indicated by B11. As the user selects an icon indicated by B12, the screen indicated by B10 shifts to a screen indicated by B20 after the lapse of the foregoing predetermined waiting time. The screen indicated by B20 is the direction input screen described above with reference to step S210 in FIG. 4.

The control unit 150 executes processing of displaying a message image describing that the direction in which the electronic device 200 is located should be inputted, as indicated by B21, and an input area image indicated by B22, on the direction input screen indicated by B20. The user performs a predetermined operation input to the part of the input area indicated by B22 on the touch panel forming the display unit 160. The control unit 150 executes processing of displaying a direction image indicated by B23 in such a way as to correspond to the predetermined operation input by the user. In this way, in the information processing device 100 in this embodiment, the control unit 150 executes the processing of displaying the direction input screen and the input information acquisition unit 130 acquires the input information based on the operation input by the user on the direction input screen. Thus, the user can specify the electronic device 200 that is the connection target by performing the operation input using the direction input screen.

The predetermined operation input is specifically, for example, a flick operation. However, the predetermined operation input is not limited to this and may be a swipe operation. In this way, in the information processing device 100 in this embodiment, the input information acquisition unit 130 acquires the input information based on the flick operation input or the swipe operation input inputted by the user on the touch panel where the direction input screen is displayed. Thus, the user can specify the electronic device 200 that is the connection target by performing the operation input using the flick operation input or the swipe operation input.

Figure 9:
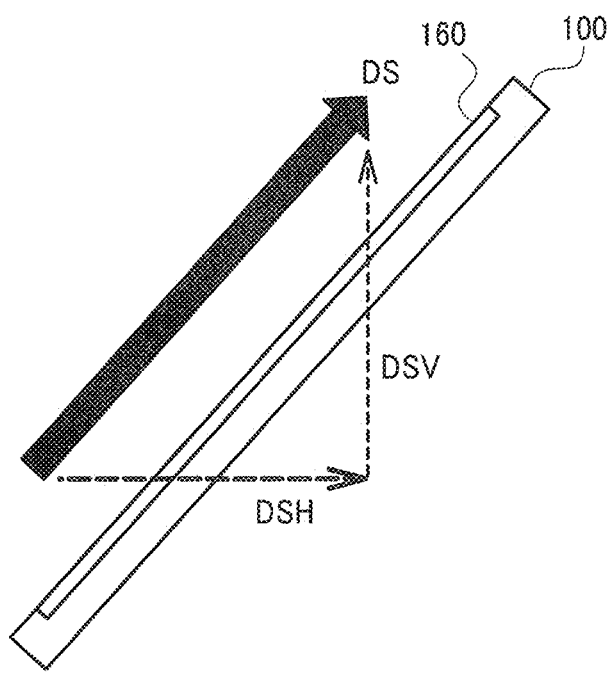
FIG. 9 explains the relationship between a direction in which the information processing device or the like faces and a horizontal direction.

In this embodiment, the information processing device 100 faces in the horizontal direction, as described above with reference to FIG. 5. Therefore, the vector in the direction of operation by the predetermined input operation is in a direction parallel to the horizontal plane. Also, for example, when the information processing device 100 faces in a direction DS forming a predetermined angle of elevation to the horizontal direction, as shown in FIG. 9, the control unit 150 may resolve the direction DS into a direction DSH parallel to the XY plane and a direction DSV parallel to the Z-axis and then execute the input information acquisition processing (step S230) or the like based on the direction DSH. For example, the control unit 150 finds the direction DSV, based on information of the direction of gravity that can be acquired via a geomagnetic sensor or a gyro sensor, not illustrated, that is included in the information processing device 100, and thus can resolve the direction DS into the direction DSH and the direction DSV. Therefore, even when the information processing device 100 does not face in the horizontal direction, the technique according to this embodiment can be applied as in the case where the information processing device 100 faces in the horizontal direction. In this way, in the information processing device 100 in this embodiment, the control unit 150 executes the processing of extracting a horizontal direction component of the direction of the flick operation input or the direction of the swipe operation input, specifying the electronic device 200 corresponding to the input information, based on the horizontal direction component, and connecting to the specified electronic device 200. Thus, the control unit 150 can properly specify the electronic device 200 located in the horizontal direction. While FIG. 9 relates to the description of an example using the angle of elevation, the same applies to the angle of depression.

Figure 10:
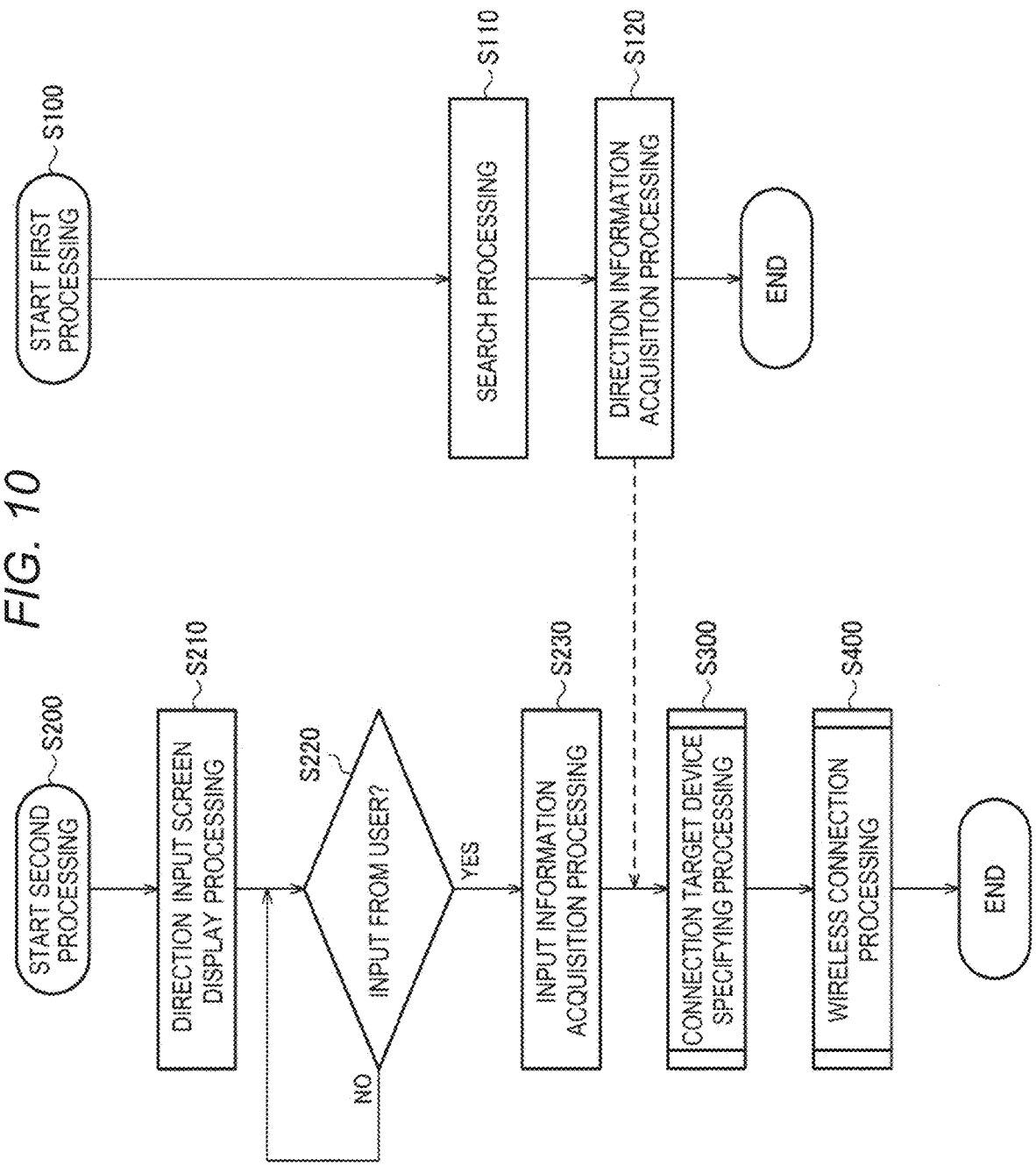
FIG. 10 is a flowchart explaining a processing example in a modification example.

The technique according to this embodiment is not limited to the above and can be implemented with various modifications. For example, while FIGS. 2 to 4 show a processing example where the second processing (step S200) is executed after the first processing (step S100), the information processing device 100 may execute the first processing (step S100) and the second processing (step S200) in parallel as shown in FIG. 10, as a modification example. Specifically, the information processing device 100 starts the second processing (step S200) and also starts the first processing (step S100) at the same time. The first processing (step S100) is executed periodically by a timer interrupt. The control unit 150 then executes the connection target device specifying processing (step S300), based on the input information acquired in the input information acquisition processing (step S230) and the direction information acquired in the direction information acquisition processing (step S120). The processing of each step in FIG. 10 is similar to the processing of each step in FIGS. 3 and 4 and therefore will not be described further. In this way, in the information processing device 100 in this embodiment, the control unit 150 executes, in parallel, the processing of displaying the direction input screen and the processing where the search result acquisition unit 120 acquires the information of the search result. Thus, the time taken to specify the electronic device 200 can be reduced. Specifically, the predetermined waiting time can be reduced, compared with the processing example where the second processing (step S200) is executed after the first processing (step S100) as described above with reference to FIG. 2 and the like. In the processing shown in FIG. 10, the timer interrupt of the first processing (step S100) may be executed a plurality of times before the connection target device specifying processing (step S300) is executed. In this case, the control unit 150 may overwrite and update the acquired direction information again and execute the connection target device specifying processing (step S300), based on the latest direction information.

Figure 11:
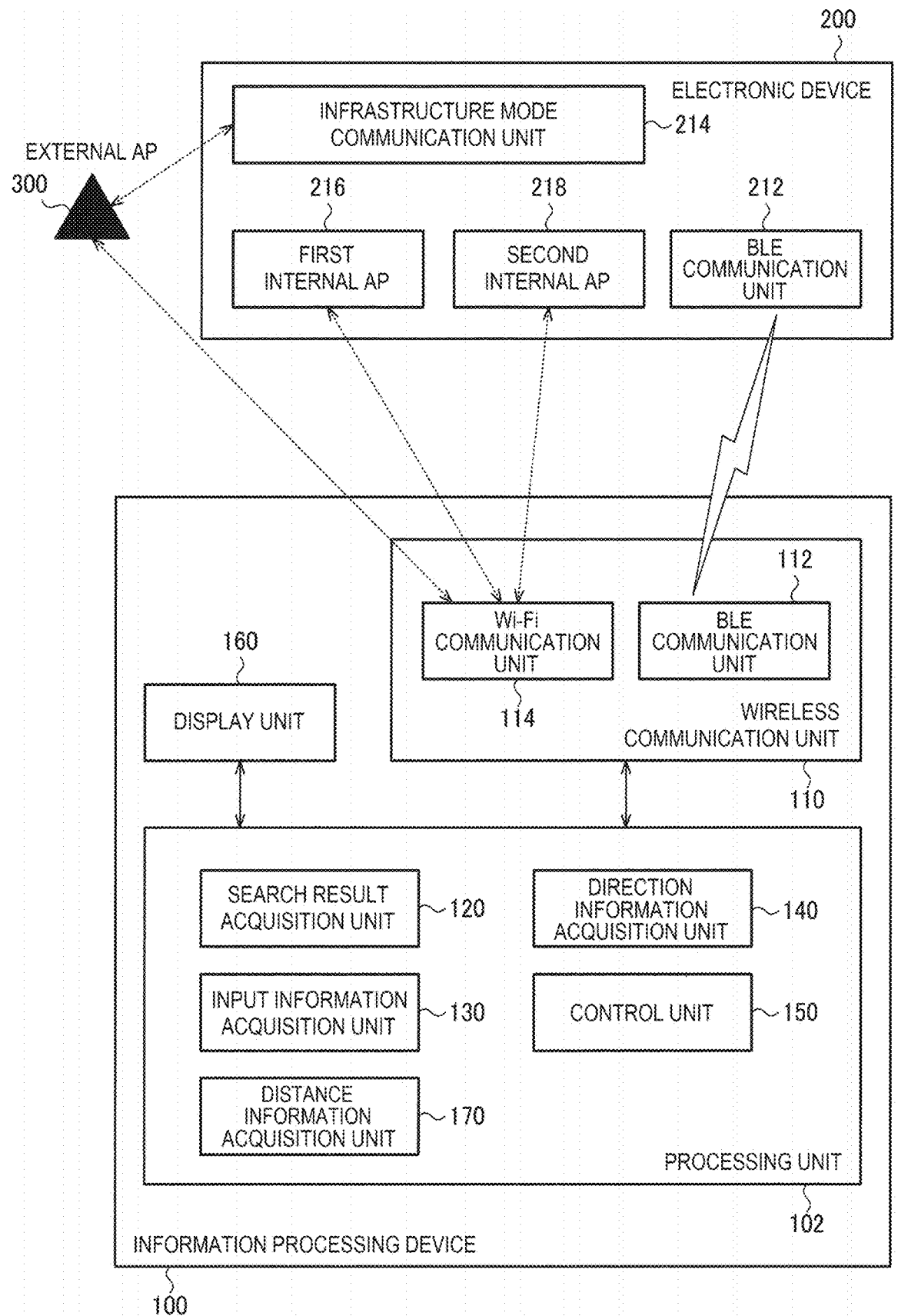
FIG. 11 explains an example of the configuration or the like in another modification example.
Figure 12:
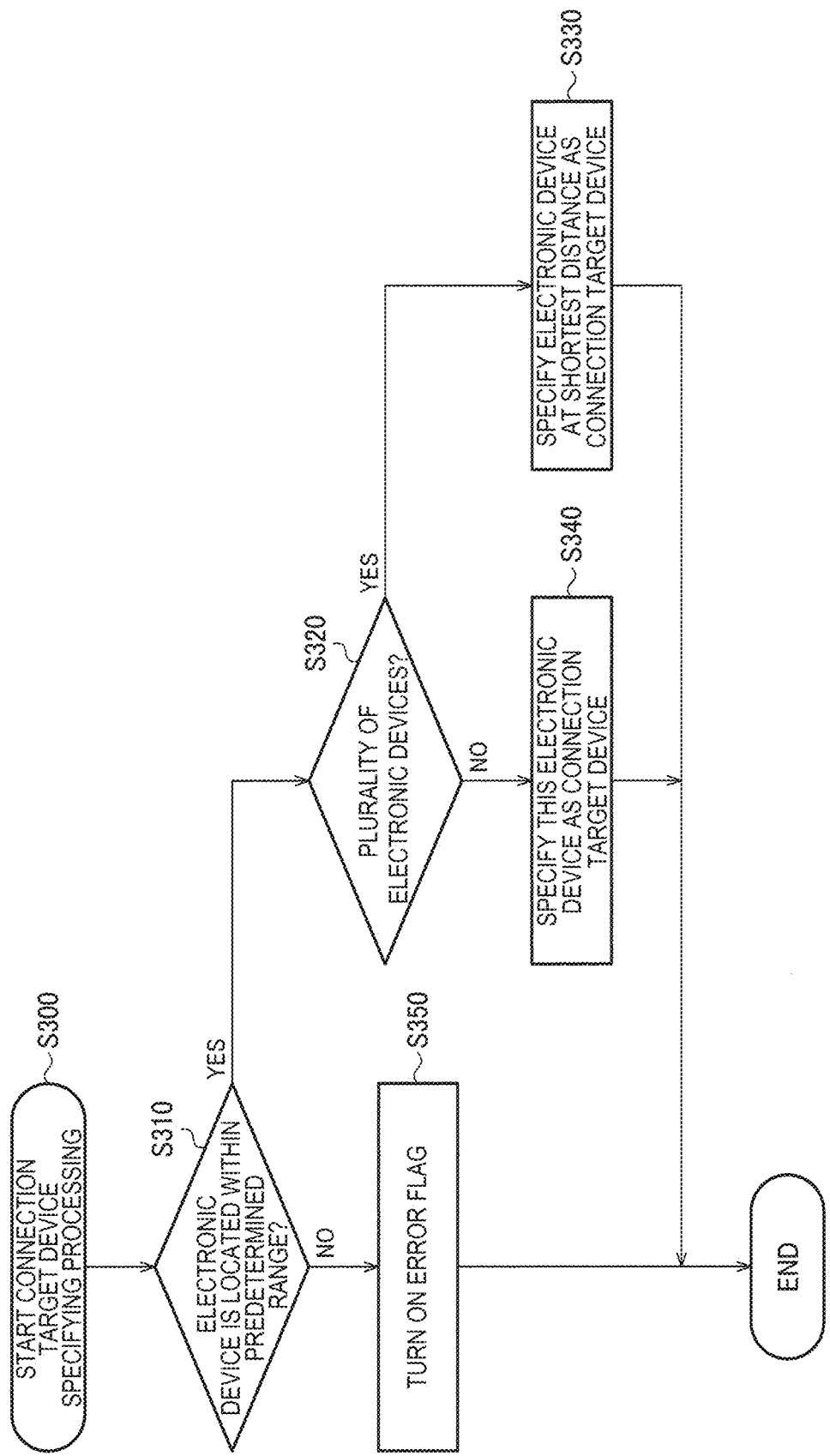
FIG. 12 is a flowchart explaining a processing example of connection target device specifying processing in another modification example.

The technique according to this embodiment is not limited to the above. For example, as another modification example, the information processing device 100 may further include a distance information acquisition unit 170, as shown in FIG. 11. Also, the connection target device specifying processing (step S300) described above with reference to FIG. 6 may be executed as in a processing example shown in FIG. 12 as another modification example. When FIG. 6 and FIG. 12 are compared, the processing example in FIG. 12 differs from the processing example in FIG. 6 in further including step S320 and step S330.

The distance information acquisition unit 170 acquires distance information representing the distance from the electronic device 200 by short-range wireless communication with the electronic device 200 via the wireless communication unit 110. The acquisition of the distance information can be implemented, for example, by a technique described below. For example, when the BLE communication unit 112 receives a radio wave based on BLE, a BLE advertisement packet includes reference radio wave intensity information and therefore the control unit 150 can acquire the information of the distance between the information processing device 100 and the electronic device 200. The reference radio wave intensity is the received signal strength indication (RSSI) of a beacon signal at a receiving-side device installed at a location away from a transmitting-side device of the beacon signal by a reference distance. The radio wave intensity is in inverse proportion to the square of the distance. Therefore, if the radio wave intensity at the reference distance is known, the control unit 150 can compute the information about the distance between the information processing device 100 and the electronic device 200 or the like, based on the radio wave intensity of the BLE beacon signal actually received by the BLE communication unit 112. The information about the distance between the information processing device 100 and the electronic device 200 or the like may be, for example, a specific distance such as "1.5 m" or may be information of a distance range group, described later with reference to FIG. 13 or the like, and can be suitably decided by the user according to the specifications of the connection application. Based on the radio wave intensity of the beacon signal received by the BLE communication unit 112, the control unit 150 transmits the distance information displayed on the connection application to the distance information acquisition unit 170.

A processing example of the connection target device specifying processing (step S300) in another modification example will now be described, using the flowchart of FIG. 12. The detailed description of the same processing as in the flowchart of FIG. 6 is omitted where appropriate. When the control unit 150 has determined that the electronic device 200 is located within the predetermined range (YES in step S310), the control unit 150 executes processing of determining whether a plurality of electronic devices 200 are located within the predetermined range or not (step S320). When the control unit 150 has determined that one electronic device 200 is located within the predetermined range (NO in step S320), the control unit 150 executes processing of specifying this electronic device 200 as a connection target device (step S340). That is, the processing corresponding to a case of NO in step S320 is substantially the same as in the processing shown in FIG. 6.

Meanwhile, when the control unit 150 has determined that a plurality of electronic devices 200 are located within the predetermined range (YES in step S320), the control unit 150 executes processing of specifying the electronic device 200 at the shortest distance from the information processing device 100 as a connection target device (step S330). For example, the control unit 150 executes processing of converting the information about the distance with respect to the plurality of electronic devices 200 into numerical values, based on the received signal strength indication of the BLE beacon signal, as described above, and specifying the electronic device 200 with the smallest numerical value as the electronic device 200 that is the connection target. This is because, when a plurality of electronic devices 200 are located in a desired direction, using the electronic device 200 at the shortest distance is convenient for the user. In this way, the information processing device 100 in this embodiment further includes the distance information acquisition unit 170 acquiring the distance information representing the distance from the electronic device 200 by short-range wireless communication with the electronic device 200 via the wireless communication unit 110. When the control unit 150 has specified a plurality of electronic devices 200 as a connection target based on the direction information, the control unit 150 executes the processing of specifying the electronic device 200 at the shortest distance from the information processing device 100 as a connection target, based on the distance information. Thus, the control unit 150 can specify a proper electronic device 200 from among a plurality of electronic devices 200 located in the same direction.

FIG. 12 shows a processing example where the control unit 150 automatically specifies the electronic device 200 at the shortest distance from the information processing device 100 as a connection target device when a plurality of electronic devices 200 are located within the predetermined range. However, the technique according to this embodiment is not limited to this. For example, though not illustrated in any flowchart, when a plurality of electronic devices 200 are located within the predetermined range, the control unit 150 may execute processing of displaying information about the plurality of electronic devices 200 in the form of a list and thus may enable the user to select a desired electronic device 200 from the list.

For example, as shown in FIG. 13, it is assumed that the information processing device 100 and the electronic device 200-1 are located as in FIG. 5 and that an electronic device 200-3 is located at a location indicated by A4. A first distance range group, which is a range of a first predetermined distance from the information processing device 100, is defined as "near". A second distance range group outside the first distance range group is defined as "far". A line indicated by A5 is an imaginary boundary between "near" and "far". As the distance information, it is assumed that the electronic device 200-1 is located within the range of the first distance range group and that the electronic device 200-3 is located in the range of the second distance range group.

Figure 8:
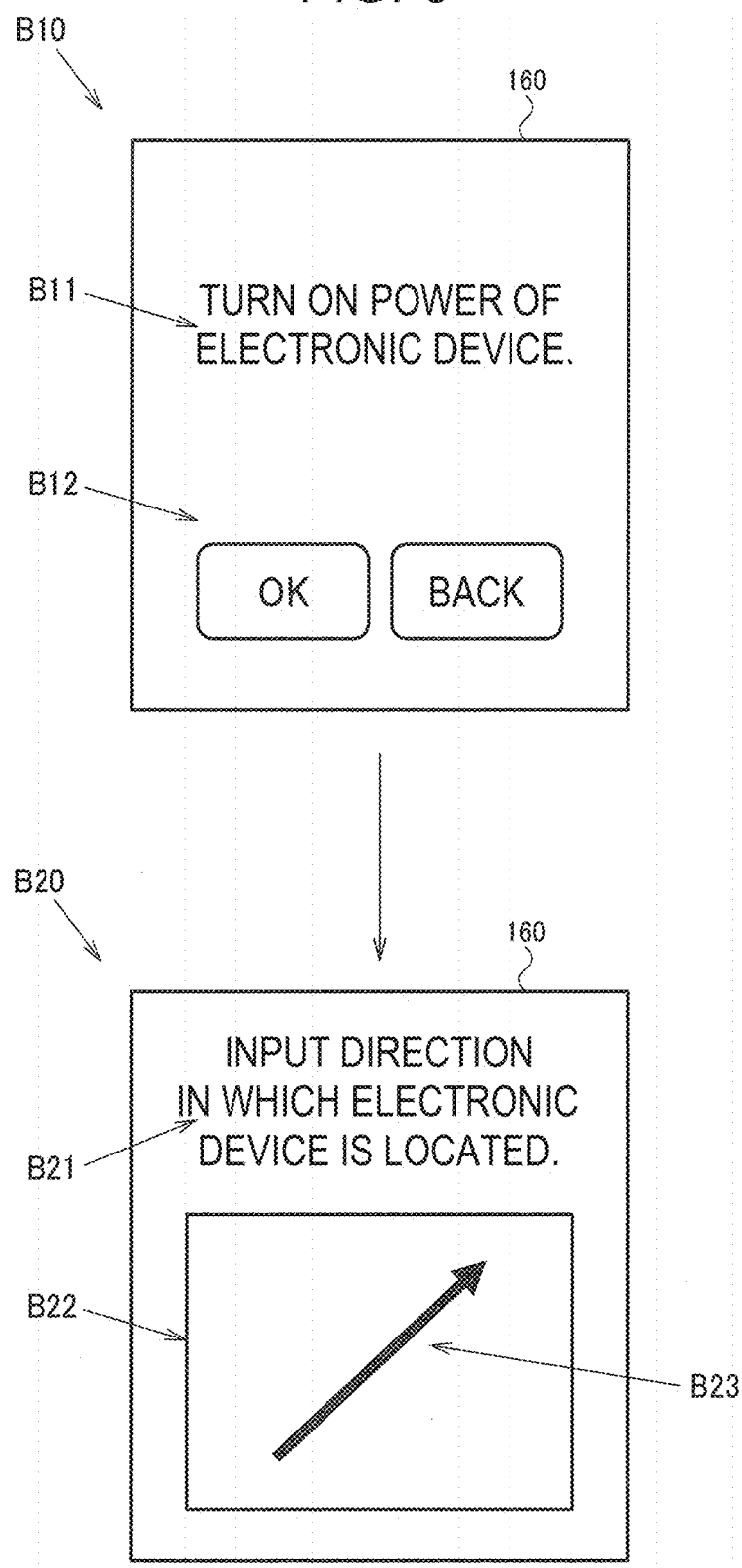
FIG. 8 explains a screen example in the information processing device.
Figure 14:
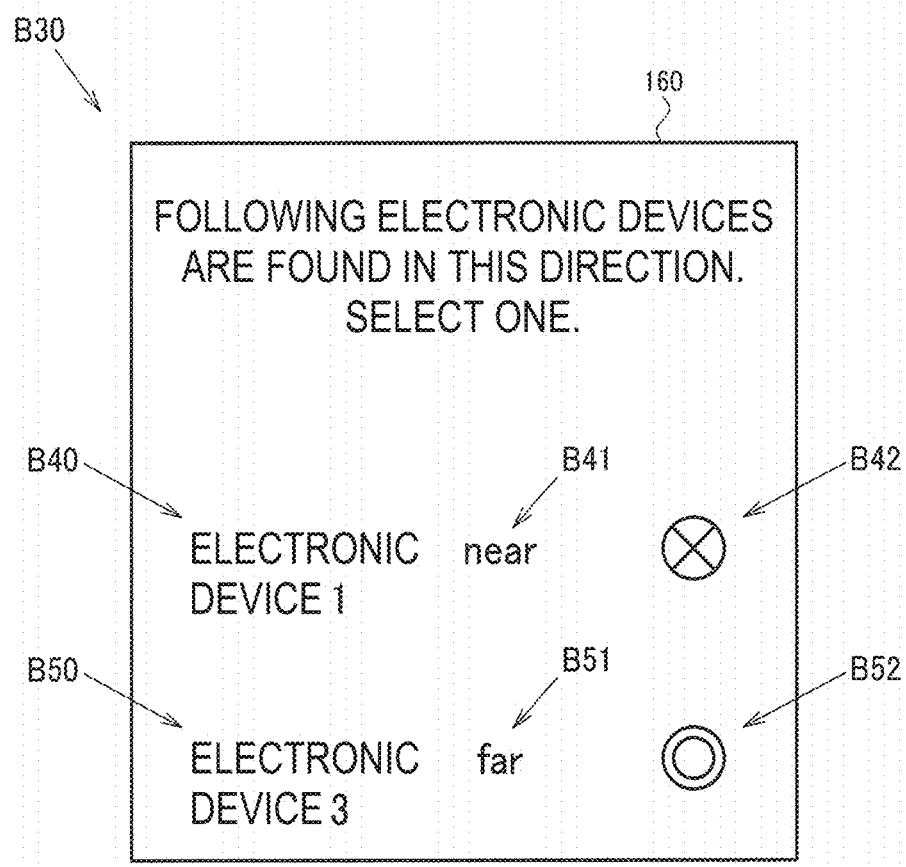
FIG. 14 explains an example of a list about electronic devices.

In this case, for example, when the user performs a predetermined input operation, the control unit 150 executes, for example, processing of shifting from the screen indicated by B20 in FIG. 8 to a screen indicated by B30 in FIG. 14. In the screen indicated by B30, information about the electronic device 200-1 as indicated by B40 and information about the electronic device 200-3 as indicated by B50 are shown. In FIG. 14, the electronic device 200-1 is simply referred to as electronic device 1 and the electronic device 200-3 is simply referred to as electronic device 3. As the information about the electronic device 200-1, for example, "near" indicating that the electronic device 200-1 belongs to the first distance range group is shown, as indicated by B41. Similarly, as the information about the electronic device 200-3, for example, "far" indicating that the electronic device 200-3 belongs to the second distance range group is shown, as indicated by B51. The control unit 150 may also execute processing of displaying other information in the list indicated by B30. The other information may be, for example, information representing the status of the electronic device 200, information representing whether there is a connection history or not, or information representing whether a connection setting is needed or not. The other information can be suitably set by the user. For example, an icon indicated by B42 in FIG. 14 is a form indicating that the status of the electronic device 200-1 is an error state. An icon indicated by B52 is a form indicating that the status of the electronic device 200-3 is a waiting state. The control unit 150 may execute processing of hiding the icons indicated by B42, B52 with respect to the electronic device 200 having no connection history in the past. In this way, in the information processing device 100 in this embodiment, when the control unit 150 has specified a plurality of electronic devices 200 as a connection target, the control unit 150 executes the processing of displaying a list of the specified electronic devices 200. Thus, the user can properly determine the electronic device 200 to be connected. For example, the user views the list showing the information about the electronic device 200-1 and the information about the electronic device 200-3 and thus can properly determine which electronic device 200 to be selected. For example, when the user wants to give priority to the selection of the electronic device 200 near the user, the user can make a determination to take measures to resolve the error state of the electronic device 200-1. Meanwhile, when the user wants to give priority to the use of the electronic device 200, the user can make a determination to select the electronic device 200-3 even though the electronic device 200-3 is far from the user.

As described above, the information processing device according to the embodiment wirelessly communicates with an electronic device via a wireless communication unit and includes a search result acquisition unit, an input information acquisition unit, a direction information acquisition unit, and a control unit. The search result acquisition unit acquires information of a search result about the electronic device by a search via the wireless communication unit. The input information acquisition unit acquires input information inputted as a direction of the electronic device that is a connection target, in relation to the information processing device. The direction information acquisition unit acquires direction information representing a direction in which the electronic device exists, by short-range wireless communication with the electronic device via the wireless communication unit. The control unit executes processing of specifying the electronic device corresponding to the input information from among the electronic devices found by the search, based on the direction of the direction information and the direction of the input information, and connecting to the specified electronic device.

Thus, the information processing device according to the embodiment includes the input information acquisition unit and thus can acquire the input information based on an input operation by the user. The information processing device further includes the control unit and thus can connect to the electronic device properly specified, based on the direction of the direction information and the direction of the input information.

When the electronic device is located within a predetermined range including an inputted direction, based on the direction information, the control unit may execute processing of specifying this electronic device as a connection target.

Thus, the control unit can specify the electronic device more accurately.

The control unit may not execute processing of connecting to the electronic device when an inputted direction is different from a direction within a predetermined range.

Thus, a situation where an electronic device other than a desired electronic device and the information processing device are connected can be prevented.

The control unit may execute processing of displaying a direction input screen. The input information acquisition unit may acquire the input information, based on an operation input by a user on the direction input screen.

Thus, the user can specify the electronic device that is the connection target, by performing the operation input using the direction input screen.

The input information acquisition unit may acquire the input information, based on a flick operation input or a swipe operation input inputted by the user to a touch panel where the direction input screen is displayed.

Thus, the user can specify the electronic device that is the connection target, by performing the operation input using the flick operation input or the swipe operation input.

The control unit may execute processing of extracting a horizontal direction component of a direction of the flick operation input or a direction of the swipe operation input, specifying the electronic device corresponding to the input information, based on the horizontal direction component, and connecting to the specified electronic device.

Thus, the control unit can properly specify the electronic device located in the horizontal direction.

The control unit may execute, in parallel, processing of displaying the direction input screen and processing where the search result acquisition unit acquires the information of the search result.

Thus, the time taken to specify the electronic device can be reduced.

When specifying a plurality of the electronic devices as a connection target, the control unit may execute processing of displaying a list of the specified electronic devices.

Thus, the user can properly determine the electronic device to be connected.

The information processing device may further include a distance information acquisition unit acquiring distance information representing a distance from the electronic device by short-range wireless communication with the electronic device via the wireless communication unit. When specifying a plurality of the electronic devices as a connection target based on the direction information, the control unit may execute processing of specifying the electronic device at a shortest distance from the information processing device as a connection target, based on the distance information.

Thus, the control unit can specify a proper electronic device from among a plurality of electronic devices located in the same direction.

The program according to the embodiment causes an information processing device wirelessly communicating with an electronic device via a wireless communication unit to function. The program causes a computer to function as a search result acquisition unit, an input information acquisition unit, a direction information acquisition unit, and a control unit. The search result acquisition unit acquires information of a search result about the electronic device by a search via the wireless communication unit. The input information acquisition unit acquires input information inputted as a direction of the electronic device that is a connection target, in relation to the information processing device. The direction information acquisition unit acquires direction information representing a direction in which the electronic device exists, by short-range wireless communication with the electronic device via the wireless communication unit. The control unit executes processing of specifying the electronic device corresponding to the input information from among the electronic devices found by the search, based on the direction of the direction information and the direction of the input information, and connecting to the specified electronic device.

The embodiment has been described above in detail. However, a person skilled in the art can readily understand that various modifications can be made without substantially departing from the new matters and effects of the embodiment. Therefore, all such modification examples are included in the scope of the present disclosure. For example, a term described along with a different term having a broader meaning or the same meaning at least once in the specification or the drawings can be replaced with the different term at any point in the specification or the drawings. Also, all combinations of the embodiment and modification examples are included in the scope of the present disclosure. The configurations and operations of the information processing device and the program or the like are not limited to those described in the embodiment and can be implemented with various modifications.

What is claimed is:

1. An information processing device wirelessly communicating with an electronic device via a wireless communication unit, the electronic device being a target electronic device for connection, the information processing device comprising:
- a search result acquisition unit configured to acquire, via the wireless communication unit, a search result for a search for electronic devices, the search result including information about electronic devices found by the search, the found electronic devices including the target electronic device for connection;
- an input information acquisition unit configured to acquire input information by a user and that represents an input direction relative to the information processing device;
- a direction information acquisition unit configure to acquire, by short-range wireless communication with the target electronic device via the wireless communication, direction information representing a relative direction in which the target electronic device exists relative to the information processing device; and
- a controller executing processing configured to specify the target electronic device from among the electronic devices found by the search, based on a comparison of the input direction input by the user and the relative direction between the information processing device and the target electronic device, and as a result of the specifying of the target electronic device, connecting to the target electronic device.

2. The information processing device according to claim 1, wherein
when the target electronic device is located within a predetermined directional range around the input direction, the controller is configured to specify the target electronic device as a connection target in response to determining that the target electronic device is within the directional range relative to the information processing device.

3. The information processing device according to claim 1, wherein
the controller is configured to not execute processing of connecting to the target electronic device when an inputted direction is different from a direction within a predetermined directional range.

4. The information processing device according to claim 1, wherein
the controller is configured to execute processing of displaying a direction input screen, and
the input information acquisition unit is configured to acquire the input information, based on an operation input by a user on the direction input screen.

5. The information processing device according to claim 4, wherein
the input information acquisition unit is configured to acquire the input information, based on a flick operation input or a swipe operation input inputted by the user to a touch panel where the direction input screen is displayed.

6. The information processing device according to claim 5, wherein
the controller is configured to execute processing of extracting a horizontal direction component of a direction of the flick operation input or of a direction of the swipe operation input, specifying the electronic device corresponding to the input information, based on the horizontal direction component, and connecting to the specified electronic device.

7. The information processing device according to claim 4, wherein
the controller is configured to execute, in parallel, the processing of displaying the direction input screen and the processing in which the search result acquisition unit acquires the information of the search result.

8. The information processing device according to claim 1, wherein
the controller is configured to execute processing of displaying a list of the specified electronic devices when specifying a plurality of the electronic devices as a connection target.

9. The information processing device according to claim 1, further comprising:
- a distance information acquisition unit configured to acquire distance information representing a distance from the electronic device by short-range wireless communication with the electronic device via the wireless communication unit, and
- when specifying a plurality of the electronic devices as a connection target based on the direction information, the controller is configured to execute processing of specifying the electronic device at a shortest distance from the information processing device as a connection target, based on the distance information.

10. A non-transitory computer-readable storage medium storing a program, the program causing an information processing device wirelessly communicating with an electronic device via a wireless communication unit to function, the program causing a computer to function as:
- a search result acquisition unit acquiring, via the wireless communication unit, a search result for a search for electronic devices, the search result including information about electronic devices found by the search, the found electronic devices including the target electronic device for connection;
- an input information acquisition unit acquiring by a user and that represents and input direction relative to the information processing device;
- a direction information acquisition unit acquiring-, by short-range wireless communication with the target electronic device via the wireless communication, direction information representing a relative direction in which the target electronic device exists relative to the information processing device; and
- a controller executing processing to specify the target electronic device from among the electronic devices found by the search, based on a comparison of the input direction input by the user and the relative direction between the information processing device and the target electronic device information and the direction of the input information, and as a result of the specifying of the target electronic device, connecting to the target electronic device.

* * * * *